United States Patent [19]

Yoshioka

[11] Patent Number: 5,094,039

[45] Date of Patent: Mar. 10, 1992

[54] GEAR TYPE TOOL

[75] Inventor: Hajime Yoshioka, Kyoto, Japan

[73] Assignee: Mitsubishi Jukogyo Kabushiki Kaisha, Tokyo, Japan

[21] Appl. No.: 597,871

[22] Filed: Oct. 15, 1990

[30] Foreign Application Priority Data

Oct. 16, 1989 [JP] Japan .................. 1-266220

[51] Int. Cl.$^5$ ............................. B24B 55/02
[52] U.S. Cl. ............................................. 51/267
[58] Field of Search .................. 51/266, 267, 262

[56] References Cited

U.S. PATENT DOCUMENTS 3,176,675 4/1965 Bomba ........................... 125/15
3,777,443 12/1973 Shaw ............................. 51/267

FOREIGN PATENT DOCUMENTS 16921 of 1988 Japan .

OTHER PUBLICATIONS

"Kikai To Kougu", Published Aug. 1989, pp. 18-20.

Primary Examiner—Roscoe V. Parker
Attorney, Agent, or Firm—McGlew & Tuttle

[57] ABSTRACT

The present disclosure relates to a gear type tool for use in the finishing operation of the toothed surface of a work having teeth of gears and the like, wherein said tool comprises a working liquid reservoir defined at a side of the tool body and a working liquid supplying path which communicates with said oil reservoir and the bottom land of the working teeth. A working liquid which has been supplied to said oil reservoir is supplied to said bottom land therefrom via said supplying path under centrifugal forces.

4 Claims, 3 Drawing Sheets

GEAR TYPE TOOL

FIELD OF THE INVENTION

The present invention relates to a gear type tool for use in the finishing operation of gears and the like, and particularly to such a tool which is designed to provide an improved working liquid supplying efficiency.

BACKGROUND OF THE INVENTION

Gear type tools such as a gear type grinding wheel and a shaving cutter are known as tools for use in the finishing operation of gears. In these tools, the tool is brought into engagement with the gear to be worked and with a suitable shaft angle defined therebetween. The working operation is performed by rotating either the tool or the gear. During this operation, the tool and the gear are caused to slip between their engaging surfaces, and thereby undesirably grinding or cutting the toothed surface of the gear.

By way of example, FIG. 3 illustrates a gear type grinding wheel (to be merely referred to as a "tool" hereinafter) in a partly cross-sectional view, whereas FIG. 4 illustrates the working teeth of the gear in perspective. The tool 1 in the illustrated example has gear-shaped working teeth 3 formed integrally with and on the outer circumference of the base metal 2 and hard grains secured over the inner grinding toothed surface 4 of the gear 3 through an electrodeposition and the like. The base metal 2 is formed by coupling a boss portion 6 for engagement with a tool-mounting shaft 5 (shown by a double-dotted chain line) and and a rim portion 7 having working teeth 8 formed therein, integrally with each other through a disk-portion 8, and manufactured through a turning operation.

In general, a cutting oil is sprayed toward a working station so as to dissipate frictional heat and remove chips produced during the grinding operation.

Because the tool 1 is caused to rotate in engagement with the gear, i.e., working at a fast speed while the above-described gear type tool is being operated for a working purpose, it is extremely difficult for the cutting oil to be fed to a grinding point exactly on the toothed surface, because the oil tends to be dissipated under the effect of centrifugal forces among others, and thereby causing a plug-up of the tool 1 and the like at its toothed surface 4. As a consequence, precise performance characteristics of tools tool available for grinding operation have been impaired.

To eliminate such drawbacks, a gear type grinding tool (shown in FIG. 5 and FIG. 6 generally in cross-sectional view and a pespective view for the tool) has been proposed in a prior art such as those disclosed in the Japanese Patent Application Disclosure No. SHO 63-16921 Official Gazzette. In this tool, an oiling path 9 is provided in the interior of the tool-mounting shaft 5 and a grinding oil is designed to be supplied under pressure toward a multiple of holes 10 defined through the toothed surface 4 of the grinding tooth 3 from the oiling path 9 so that the grinding point may be directly supplied with the grinding fluid. However, it is very difficult to manufacture such a tool practically, and additionally a substantial cost is needed for carrying out such manufacture. The tool is designed such that the grinding oil is supplied from the interior of the tool-mounting shaft 5 under pressure, and thus the oiling mechanism becomes complicated.

OBJECTS AND SUMMARY OF THE INVENTION

The present invention has been made with the above-described state of the art into consideration, and therefore its object is to provide a gear type tool which is adapted to supply a working liquid effectively to a working station with its simplified construction.

To achieve this purpose, the present invention provides a gear type tool having gear-shaped working teeth formed around the outer circumference of the cylindrical tool body, wherein a working liquid reservoir is provided at a side of the tool for containing a working liquid therein, whereas a working liquid supplying path is defined which communicates with the bottom land of the working tooth from the working liquid reservoir.

With the rotation of the tool, the working liquid is supplied from the working liquid reservoir to the bottom land via the working liquid supply path under centrifugal forces, and the working liquid serves to remove a frictional heat or chips from the toothed surface, i.e., from the working station.

In the gear type tool in accordance with the present invention, a working fluid reservoir is provided at a side of the tool body and a working liquid is supplied to the bottom land through a working liquid supply path under centrifugal forces due to the rotation of the tool, and therefore it is possible for the working liquid be supplied effectively to the working station while ensuring an easy and economical manufacture of the tool, whereby realizing improved working life and working precision of the tool.

DETAILED DESCRIPTION OF PREFERRED EMBODIMENTS

Figure 1:
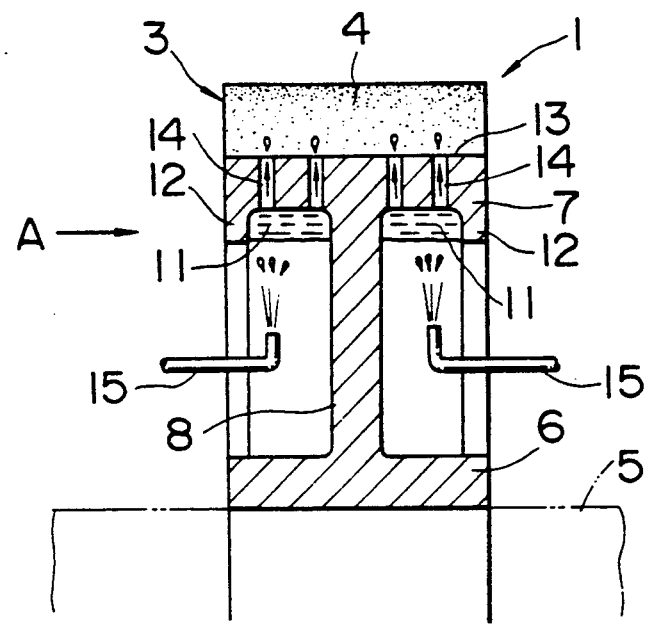
FIG. 1 is a partially cross-sectional view illustrating the first embodiment of the gear type tool in accordance with the present invention.

One embodiment of the present invention will be described particularly hereinbelow with reference to accompanying drawings. Meanwhile, it is to be noted that similar reference numerals are used in this embodiment to represent members identical with those as illustrated in the prior art described hereinbefore in order to avoid their duplicate description.

Figure 2:
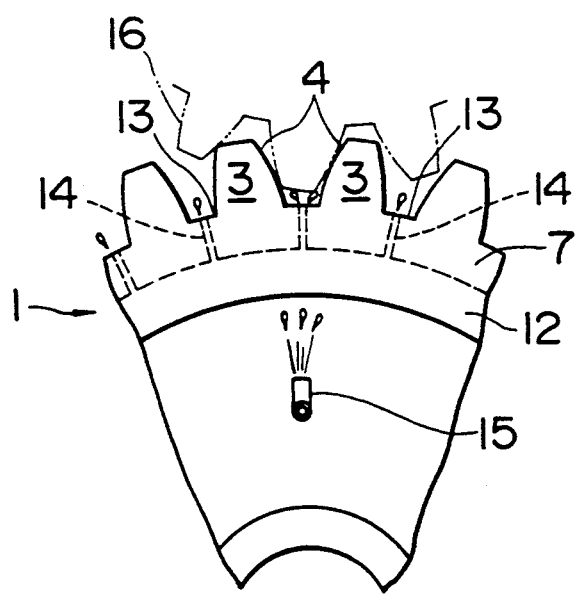
FIG. 2 is a cross-sectional view along the line A—A in FIG. 1.
Figure 3:
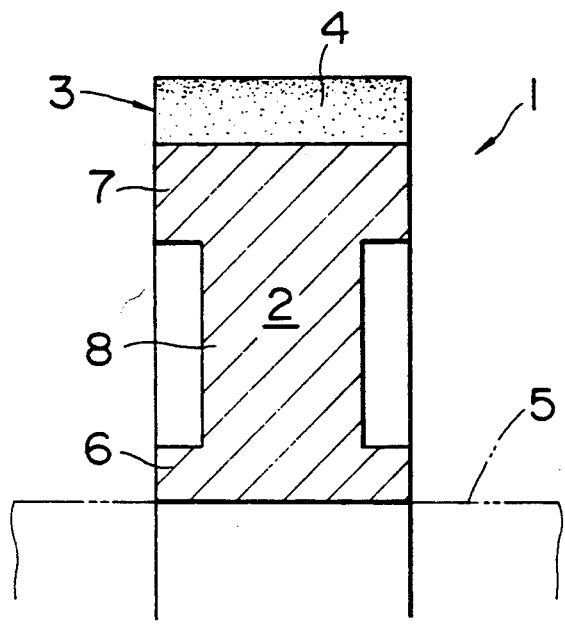
FIG. 3 and FIG. 4 are a partial cross-sectional view illustating the traditional gear type grinding tool and a perspective view illustrating its working teeth respectively.
Figure 4:
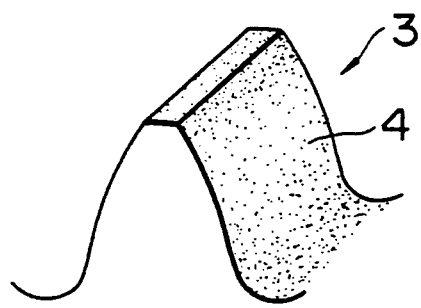
Figure 5:
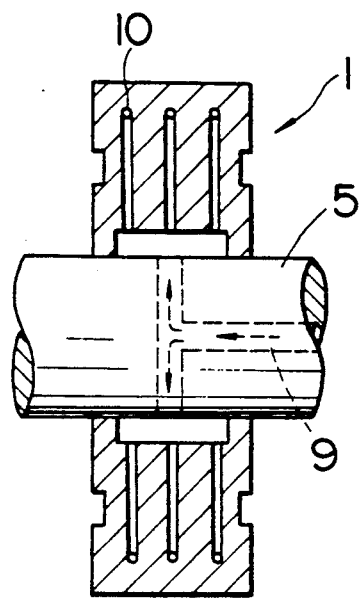
FIG. 5 and FIG. 6 are a cross-sectional view illustrating the prior art improved version gear type grinding tool and a perspective view illustrating its working teeth.
Figure 6:
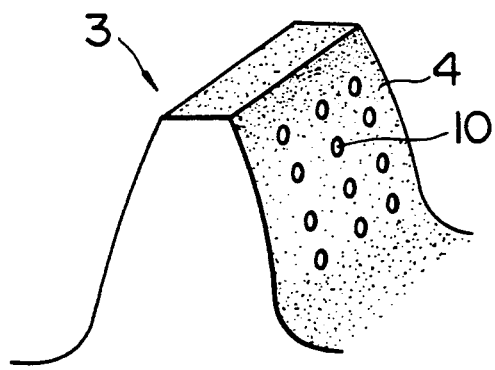

FIG. 1 illustrates one embodiment of the gear type grinding tool in accordance with the present invention in a partial cross-sectional view, whereas FIG. 2 illustrates the grinding tool of FIG. 1 in a cross-sectional view taken along the line A—A.

As illustrated in these drawings, the tool 1 of the present invention is provided with an annular oil reservoir 11 as the working liquid reservoir portion arranged along the lateral internal sides of the rim portion 7 at the base metal 2 which acts as a tool body. The oil reservoir 11 is formed by having a flange 12 provided within the end surface of the rim portion 7, and a volume capacity is ensured in this embodiment by making the disk portion 8 thinner than in the prior art. The rim portion 7 is provided with a plurality (four in this embodiment) of small-diameter oil holes 14 oriented toward the bottom land of the grinding teeth 3 from the oil reservoirs 11, these oil holes serving as a working liquid path.

On the other hand, an oiling pipe 15 is arranged inside the metal 2 from laternal opposide directions of the tool 1, such that a grinding oil may be fed from an oil tank into opposite oil reservoirs 11 via an oiling device (not shown), such as for example a pump.

The operation of this embodiment will be described hereinbelow.

In the gear type grinding tool in accordance with this embodiment, when the tool 1 is rotated in engagement with the gear 16 (as shown with a bouble-dotted chain line in FIG. 2), a grinding oil which has been contained inside the oil reservoir 11 is supplied to the bottom land 13 of the grinding teeth 3 under centrifugal forces passing through the oil hole 14. The grinding oil thus supplied is then guided to flow to the grinding point on the teethed surface under centrifugal forces for thereby cooling that portion or removing chips therefrom.

A pressure which is used to supply the grinding oil in this case is acceleratedly elevated with the increase of the working speed, because the magnitude of centrifugal forces increases in proportion with the square of rotating speed of the tool 1. Consequently, the cooling effect of the tool is particularly increased when the working speed is high, and thereby improving the working life of the tool over that of a prior art wherein the supply of such grinding liquid has been made in a metered volume at a constant pressure.

Although the present invention has been completely described with reference to its one embodiment, the scope of the present invention is not limited to the configurations set forth. As for instance, the present invention may well be applied to a cutting tool such as a shaving cutter and the like rather than merely limited to the gear type grinding wheel.

Alternatively, it is also conceivable to provide the reservoir portion of the working liquid only on one side of the tool, or less or more of four working liquid supplying paths may be selected for the embodiment described herein, i.e., the number of the working liquid supplying paths which are defined in each of the bottom land may be, for example, less than three or more than five.

Additionally, although the oiling pipe 15 is arranged with its outlet port oriented upwardly so as to inject the working liquid upwardly, it may be also convenient to arrange the oiling pipe 15 below the tool mounting shaft 5 with the outlet port of the oiling pipe oriented downwardly so as to let the working liquid drop into the oil reservoir 11.

I claim:

1. A gear type tool which has gear-like working teeth formed around the outer circumference of the cylindrical tool body, wherein said gear type tool comprises a working liquid reservoir formed on a side surface of the tool body for containing a working liquid therein, and a working liquid supplying path which communicates from said working liquid reservoir with bottom lands of said working teeth, the working teeth having inner grinding toothed surfaces facing adjacent working teeth, engagable with gear teeth of a gear to be formed, said inner grinding toothed surfaces being in direct contact with said bottom lands of the working teeth.

2. The gear type tool as claimed in claim 1, wherein said tool body further comprises a boss portion which is engaged with a tool mounting shaft, a rim portion which defines a circumferential wall, a disk portion which couples said rim portion with said boss portion, and a flange portion which is formed on the side end of the rim portion in a direction of said tool mounting shaft, and said rim portion, said disk portion, and said flange portion define an annular recess formed as said working liquid reservoir.

3. The gear type tool as claimed in claim 2, wherein said tool comprises a working liquid reservoir which is defined with said disk portion sandwitched therebetween at opposite sides thereof.

4. A gear grinding tool comprising:
a disk;
a rim portion attached to an outer edge of said disk, said rim portion defining a circumferential wall;
flange portions formed on each axial end of said rim portion, said disk, said rim portion and said flange portions defining annular recesses on two side of said disk, said annular recesses being working liquid reservoirs, said disk, said rim portion and said flange portions being made of one piece;
gear grinding means arranged on said rim portion for grinding and forming gear teeth of a gear to be formed, said gear grinding means having working teeth with inner grinding toothed surfaces facing adjacent working teeth, and bottom lands between said working teeth, said working teeth engagable with said gear teeth of said gear to be formed; and
a plurality of working liquid supply paths connecting said working liquid reservoir to each of said bottom lands for evenly distributing a precise rate of working fluid to said inner grinding toothed surfaces.

* * * * *